United States Patent [19]

Hirano

[11] 4,397,364
[45] Aug. 9, 1983

[54] COMBINATION WEIGHING MACHINE
[75] Inventor: Takashi Hirano, Kobe, Japan
[73] Assignee: Yamato Scale Company, Ltd., Hyogo, Japan
[21] Appl. No.: 277,617
[22] Filed: Jun. 26, 1981
[51] Int. Cl.³ .............................................. G01G 19/22
[52] U.S. Cl. ....................................... 177/25; 364/567
[58] Field of Search ........................ 177/1, 25; 364/567
[56] References Cited
U.S. PATENT DOCUMENTS 3,939,928 2/1976 Murakami et al. ................. 177/1 X
4,336,852 6/1982 Hirano .................................... 177/25
4,336,853 6/1982 Hirano .................................... 177/25

Primary Examiner—George H. Miller, Jr.
Attorney, Agent, or Firm—Eugene E. Geoffrey, Jr.

[57] ABSTRACT

An automatically controlled combination weighing machine, which is generally used for packing a plurality of articles in each bag or the like so that each bag contains a predetermined weight of articles, comprising a plurality of weighing balances for weighing a plurality of articles each at the same time, arithmetic means for selecting some of these weighing balances so that the total weight of the articles on the selected balances fall within a predetermined range, and means for unloading and loading the weighing balances with articles automatically; an improvement of which is a provision of automatic drive control device for the loading means for controlling the feeding rate of the articles to the weighing balances so that an optimum number of articles are fed to each balance in order to obtain a maximum approximation of the total weight.

2 Claims, 4 Drawing Figures

COMBINATION WEIGHING MACHINE

This invention relates to a combination weighing machine having an improved self-controlled article loading mechanism.

The weighing machine, which is generally referred to as "combination balance", "combination weighing device" or "combination weighing machine", is used for extracting a plurality of articles from a group of articles, such as candies, fruits and vegetables, having relatively large variances in respective weights, to form a subgroup having a weight approximating to a predetermined intended weight which will be hereinunder referred to as "reference weight". Typical examples of such machines are disclosed in U.S. Pat. Nos. 3,939,928 and 4,267,894 which are cited herein as references. In these devices, a plurality of articles are weighed individually by a plurality of weighing balances at the same time, all mathematical combinations of the measured weights are summed and the resultant total weights are successively compared with a predetermined range of the reference weight. Thus, the combination providing total weight falling within the predetermined range is selected for use.

Such devices also include automatic loading means for feeding the articles to the respective weighing balances. In the prior art devices, the optimum number or weight of articles loaded every time on each weighing balance was not entirely taken into consideration. In fact, it was a matter of option as to how many weighing balances were involved in each combination, though the number of balances should increase with a decrease of the weight of articles on each balance. However, the inventor has become aware that this number of weighing balances involved in each combination or sub-group of articles is a critical parameter for approximating the weight of a sub-group of articles to the reference weight.

For example, when a specific combination weighing machine includes eight (8) weighing balances, the total number of combinations obtained from these balances must be $2^8-1$, that is, 255. However, the desired combinations are only a very little part of these combinations and the number of them depends upon the reference weight and the weight of articles on each balance. Assuming that the reference weight is 500 grams and each balance carries articles weighing a little more or less than 100 grams, the desired combination will be composed of five balances and the number of such combinations will be $_8C_5=56$ by the teaching of mathematics. However, assuming that the reference weight is unchanged but the weight of articles on each balance is about 250 grams, the desired combination will involve only two balances and the number of combinations will be $_8C_2=28$ only. According to the theory of probability, there should be a better chance to obtain a combination having total weight which is nearest the reference weight, when one selects it from the larger number of combinations. In the above example, there is higher probability in $_8C_5$ than in $_8C_2$ and the highest probability is obtained from the combinations $_8C_4=70$ which is the largest number of combinations obtained in this machine.

In general, when a combination weighing machine includes n-number of weighing balances, the largest number of combinations can be obtained when each combination involves n/2 balances where n is even, or $(n/2)\pm0.5$ balances where n is odd. Accordingly, the best chance can be obtained to obtain the optimum combination in this case.

This invention is based upon this principle and intends to maintain the number of weighing balances in the selected combination as above by controlling the amount of articles loaded on each balance every time.

According to this invention, a combination weighing machine comprises a plurality of weighing units each including a weighing cradle for carrying articles to be weighed and a weight sensor for sensing weight of said articles to produce a weight indicating signal. The output signals of these weight sensors are coupled respectively through normally-open switches to an adder circuit which sums the incoming signals to produce an output indicative of the total weight. This total weight is compared with a predetermined range of weight in a judging circuit which produces an output when the total weight falls within the predetermined range. The normally-open switches are controlled by corresponding outputs of a switch control circuit which serves a function of selecting its output terminals successively in accordance with a predetermined set of combinations to produce outputs therefrom. The outputs of the switch control circuit are also stored in a combination memory for utilization in response to the output of the judging circuit. A loading mechanism controlled by the outputs of the combination memory is provided in this machine for automatically feeding the articles to the respective weighing cradles.

According to a feature of this invention, the combination weighing machine is also provided with means for detecting the number of outputs produced every time from the combination memory, and means for controlling the rate of supply of the articles of the loading mechanism so that the number detected by the detecting means becomes substantially a half of the total number of the weighing units.

These and other objects and features of this invention will be described in more detail hereinunder with reference to the accompanying drawings.

IN THE DRAWINGS

Throughout the drawings, like reference numerals are used to denote like structural components.

Figure 1:
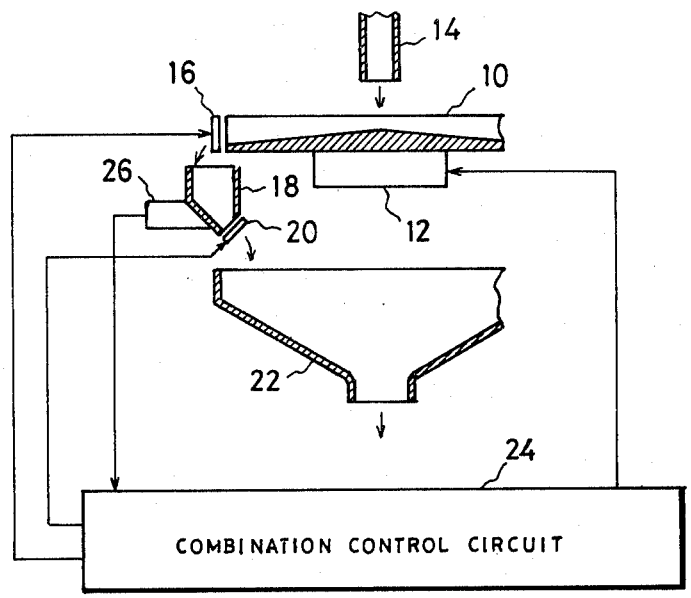
FIG. 1 is a schematic diagram representing an embodiment of a combination weighing machine to which a combination control circuit according to this invention is applied.

Referring to FIG. 1, there is shown a schematic view of a mechanical arrangement of typical automatic combination weighing machine in which this invention is embodied. The machine includes vibration feeder 10 having a slightly conical bottom wall and a peripheral side wall. The feeder 10 is provided with a vibrator 12 for applying vibration to the bottom wall so that articles supplied from a central chute 14 are shifted outwardly to the peripheral portion. The peripheral wall of the feeder 10 has a plurality of exit ports having a gate 16 each. The gates 16 are normally closed and selectively opened under control of loading signals from a combination control circuit 24 as described later. The machine also includes a plurality of weighing balances arranged surrounding the feeder 10 so that their weighing cradles 18 are disposed respectively just under the exit ports of the feeder 10. Only one of the weighing cradles is shown in the drawing for the purpose of simplicity. It is understood that the articles on the feeder 10 are fed into each weighing cradle 18 when the corresponding gate 16 is opened. Each weighing cradle 18 has a bottom opening having a gate 20 which is normally closed and selectively opened under control of unloading signal from the combination control circuit 24 as described later. Each weighing balance also includes a weight sensor 26, such as load cell, which produces an electric signal indicative of the weight of articles in the cradle 18 and supplied it to the combination control circuit 24. Under the unloading gates 20 of the respective weighing balances, a common collecting hopper 22 is disposed for collecting the articles discharged from the selected weighing balances. The articles collected in the hopper 22 and discharged from its bottom opening are transferred by suitable means for packing.

Figure 2:
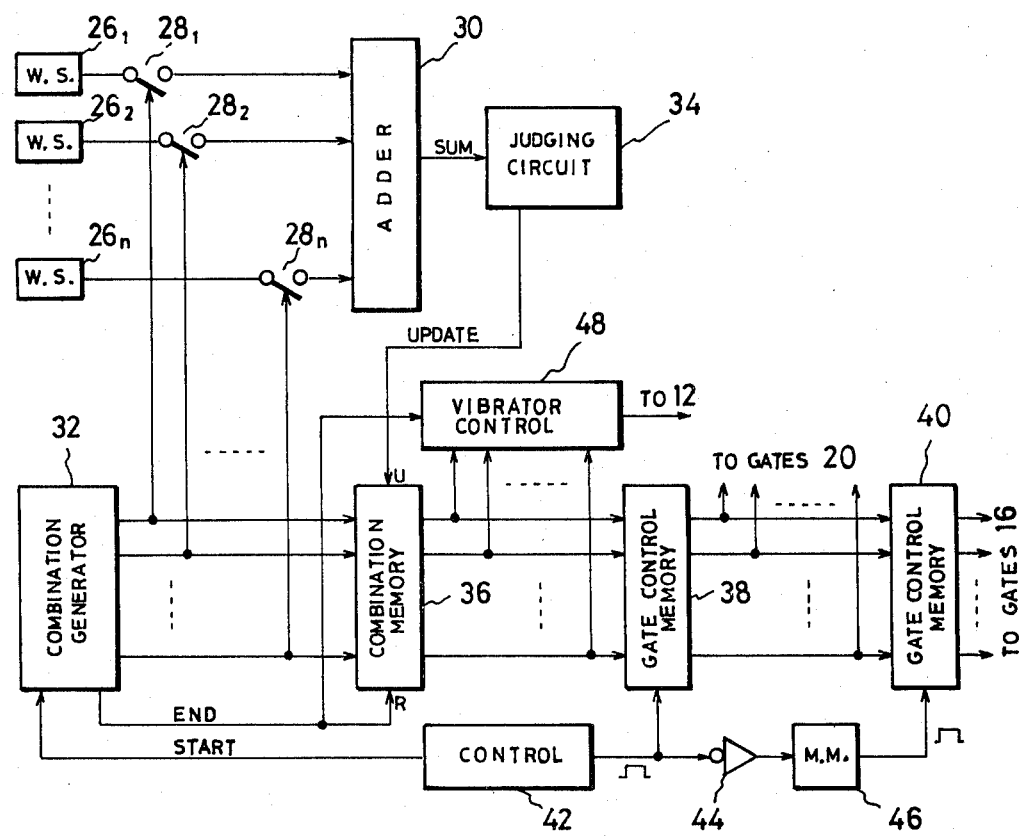
FIG. 2 is a block diagram representing a circuit configuration of the combination control circuit as shown in FIG. 1.

FIG. 2 shows a typical circuit configuration of the combination control circuit 24 of FIG. 1. The outputs of weight sensors $26_1, 26_2, \ldots 26_n$ are coupled respectively through a plurality of normally-open switches $28_1, 28_2, \ldots 28_n$, having a control terminal each, to an adder circuit 30. The adder 30 serves to sum its input signals to produce a SUM signal to a judging circuit 34.

Figure 3:
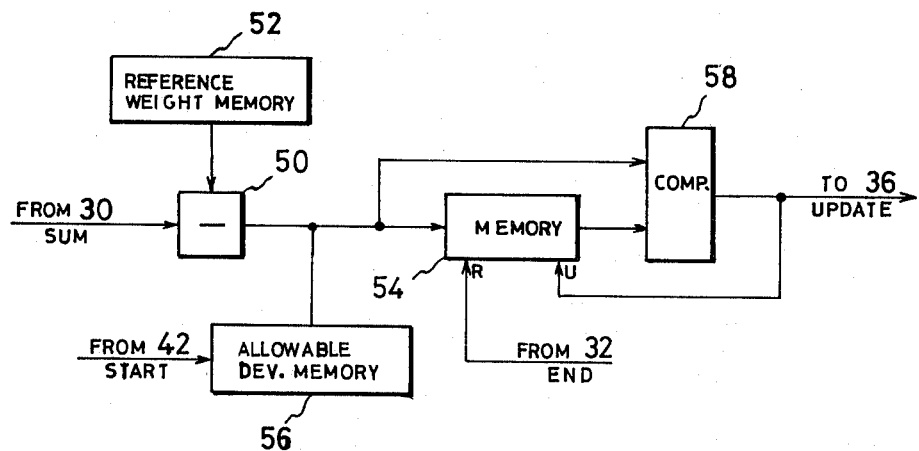
FIG. 3 is a block diagram representing an embodiment of the judging circuit of FIG. 2.

FIG. 3 shows an embodiment of the judging circuit 34 of FIG. 2, the principle of which is described in the above-cited U.S. Pat. No. 4,267,894. The SUM signal from the adder 30 is supplied to an input of a subtracter 50 another input of which is supplied from a reference weight memory 52. The reference weight memory 52, having an input device such as conventional digital keyboard (not shown), stores a predetermined total weight of articles to be packed together, that is, "reference weight". The subtracter 50 produces a difference between both inputs, that is, an absolute deviation of the measured total weight from the reference weight. The output of the subtracter 50 is coupled to a memory 54 and a comparator 58. The input of the memory 54 is also coupled to an allowable deviation memory 56 which is similar in structure to the memory 52 and stores a predetermined allowable deviation of the total weight from the reference weight. At the beginning of every cycle of operation, before the subtracter 50 produces its output, a control circuit 42 (FIG. 2) applies a START signal to the memory 56 and, in response to this signal, the memory 56 supplies its content to the memory 54 to write it therein. Then, the content of the memory 54 is inturn applied to another input of the comparator 58. Thus, when the subtracter 50 produces an output, it is compared with the allowable deviation by the comparator 58. The comparator 58 produces an UPDATE signal when the output of the subtracter 50 is less than the content of the memory 54, and the UPDATE signal is applied to an update terminal U of the memory 54 to substitute its content with the present output of the subtracter 50. Accordingly, the succeeding outputs of the subtracter 50 are compared successively with the previously updated content of the memory 54 and the content of this memory will approach zero with progression of operation. This means a gradual approach of the corresponding measured total weights to the reference weight. At the end of each cycle of combination as described later, an END signal is applied from a combination generator 32 (FIG. 2) to a reset terminal R to clear the memory 54, and a new cycle of operation will be initiated by the next START signal. The UPDATE signal is also applied to a combination memory 36 (FIG. 2) for updating its content as described later.

Returning to FIG. 2, the control terminals of the normally-open switches $28_1, 28_2, \ldots 28_n$ are coupled respectively to n-number of output terminals of a combination generator 32. The combination generator 32 is actuated by a START signal applied periodically from a control device 42 and driven by a train of clock pulses from a clock pulse generator included therein to produce a predetermined set of combinations of output signals from its selected output terminals. For example, if the predetermined set of combinations are complete mathematical combinations of the n-number of outputs, the combination generator 32 may be an n-bit binary counter having a control clock pulse input and n-number of parallel outputs corresponding to its output terminals, respectively. In this case, logic HIGH level or binary "1" will serve as the output signal from each output terminal of the combination generator 32. As well known in the art, the total number of such combinations is $2^n - 1$ and the combination generator 32 will produce $(2^n - 1)$ sets of output signals successively in synchronism with the applied clock pulses. Thus, the weight indicating signals from the weight sensors $26_1, 26_2, \ldots 26_n$ are successively applied to the adder 30 in accordance with these combinations. At the end of each cycle of combination operation, the combination generator 32 produces an END signal.

The outputs of the combination generator 32 are also supplied successively to a combination memory 36 having corresponding input and output terminals. The combination memory 36 also has an update terminal U for receiving UPDATE signal from the comparator 58 of the judging circuit 34 (FIG. 3) and a reset terminal R for receiving END signal from the combination generator 32. The combination memory 36 is arranged to store the incoming signals and update the content in response to the UPDATE signal and apply the content to an unloading gate control memory 38 and, at the same time, clear the content in response to END signal. Since UPDATE signal is applied every approach of the content of the deviation memory 54 (FIG. 3) to zero as described above, the outputs of the combination memory 36 will correspond to a combination of balances having a total weight nearest the reference weight over each cycle of operation. The gate control memory 38 stores the outputs of the memory 36.

The control device 42 is arranged to produce, in addition to START signal, a gate pulse having a predetermined duration as shown suitable for discharging the contents of weighing cradles 18 into the hopper 22 (FIG. 1), at a suitable interval. Under control of this gate pulse, the gate control memory 38 supplies its content to the unloading gates 20 of the corresponding weighing cradles 18 to open them, and also to a loading gate control memory 40 to be written therein. The gate pulse from the control device 42 is also applied through an invertor 44 to a monostable multivibrator 46. The multivibrator 46 responds to the trailing edge of the gate pulse from the control device 42 to produce another gate pulse having another predetermined duration as shown. Under control of this loading gate pulse, the loading gate control memory 40 supplies its content to the loading gates 16 of the same weighing cradles 18 to feed new articles therein.

The outputs of the combination memory 36 are also coupled to a vibration control device 48 according to this invention, which controls magnitude of vibration of the vibration feeder 10 to control the number of articles fed to each cradle 18 every time, based upon the number of inputs supplied from the combination memory at the end of every cycle of operation, thereby maintaining the optimum number of selected balances as described previously.

Figure 4:
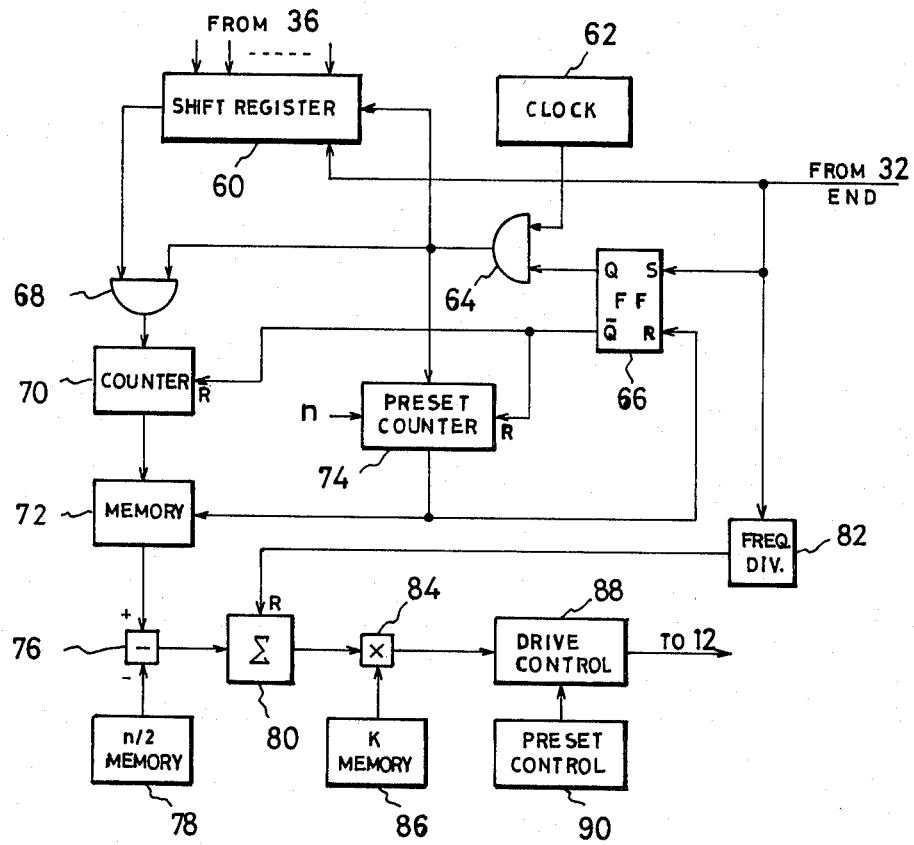
FIG. 4 is a block diagram representing an embodiment of the vibrator control circuit of FIG. 2 in which this invention is realized.

A preferred embodiment of the control device 48 is shown in FIG. 4. As shown, a shift register 60 is provided for receiving the outputs of the combination memory 36 in parallel in its n-number of stages, respectively, and storing them therein, for example, in a format such as "01100101 . . . 1", wherein "0" and "1" indicate absence and presence of input, respectively. The shift register 60 is activated by an END signal from the combination generator 32 and driven by a series of clock pulses supplied from a clock pulse generator 62 through an AND gate 64. The END signal is also applied to a set terminal of a flip-flop circuit 66 to set it. Then, the Q-output of the flip-flop 66 is applied to a second input of the AND gate 64 to open it.

The clock pulses from the clock pulse generator 62 are also supplied to an AND gate 68 to pass the output of the shift register 60 to a counter 70. The counter 70 counts the binary "1's" in the input and supplies its count successively to a memory 72 which stores the incoming count in response to a control signal supplied from a preset counter 74. The preset counter 74 is previously set to produce an output when it counts off the number (n) of weighing balances included in this machine, and counts the clock pulses supplied from the clock pulse generator 62 through the AND gate 64. Accordingly, when the output of the preset counter 74 is applied to the memory 72, the counter 70 has just completed to count the number of outputs from the combination memory 36 and the memory 72 stores this number. The output of the preset counter 74 is also applied to the reset input of the flip-flop 66 to reset it, thereby resetting both counters 70 and 74 by its $\overline{Q}$-output.

The content of the memory 72 is applied to one input of a subtracter 76 having a second input coupled to a n/2 memory 78 which stores previously a numerical value equal to a half of the number of weighing balances in the machine. The subtracter 76 subtracts the content of the memory 78 from the content of the memory 72 to produce an output indicative of the deviation of the number of selected balances from the desired number, n/2, in positive or negative polarity. The output of the subtracter 76 is applied to an accumulator 80 and accumulated therein.

The END signals supplied periodically from the combination generator 32 are applied also to a frequency divider 82 and the divider 82 produces output pulses periodically at a period which is substantially greater than that of the END pulses. The rate of division of the divider 82 may be determined suitably by trial and error technique in order to obtain an optimum condition of the machine. The accumulator 80 is reset by the output of the frequency divider 82 and applies its content to a multiplier circuit 84. The multiplier 84 multiplies the output of the accumulator 80 by a predetermined constant K stored in a K memory 86 and supplies the output to a drive control unit 88. The constant K may be selected so that the output of the multiplier 84 comes to have a value suitable for controlling the unit 88. The unit 88 is supplied with a basic driving power from a preset control unit 90 and produces an output driving power increased or decreased in response to the polarity and magnitude of the output of the multiplier 84. This output power is applied to the vibrator 12 of the feeder 10 for controlling the magnitude of vibration so as to obtain the optimum feeding rate resulting in the optimum number of selected weighing balances.

Although the above description has been made in conjunction with specific embodiments, this does not mean that the invention is limited to the details of them. It should be noted that various modifications and changes can be made by those skilled in the art on the basis of the above description without departing from the scope of this invention as claimed in the appended claims.

For example, the original feeding rate through the chute 14 may be controlled by the output of the control unit 48 instead of controlling the vibrator 12 of the vibration feeder 10. Many types of suitable feeding mechanisms other than the vibration feeder may be used. The machine may be lacking in the unloading mechanisms of each weighing balance if the unloading operation is effected manually. In such manually unloaded operation, selected weighing balances are generally indicated by indicator lamps. Accordingly, the number of outputs of the combination memory 36 may be counted by counting the number of such lamps which have been actuated. Various types of judging circuits 34 which has been proposed and may be proposed can be used instead of the circuit of FIG. 3 though the circuit of FIG. 3 is believed to be relatively effective for this purpose.

What is claimed is:

1. A combination weighing machine comprising a plurality of weighing units each having a weighing cradle for carrying articles to be weighed and a weight sensor for sensing the weight of said articles to produce a weight indicating signal; an adder circuit having a plurality of input terminals for summing incoming signals to produce a sum signal; a plurality of normally-open switches coupled respectively between said weight sensors and the input terminals of said adder circuit and provided each with a control terminal; a judging circuit for comparing said sum signal with a specific range of weight to produce an output signal when said sum falls within said range; a switch control circuit having a plurality of output terminals coupled respectively to the control terminals of said normally-open switches for selecting said output terminals successively in accordance with a predetermined set of combinations and producing output signals therefrom to close corresponding ones of said normally-open switches; a combination memory having a plurality of input terminals coupled to the outputs of said switch control circuit and corresponding output terminals for storing the inputs in response to the output of said judging circuit; and loading means controlled in response to the outputs of said combination memory for feeding articles into said cradles; said machine further comprising counting means for counting the number of outputs produced from said combination memory each time to provide a count of said number, comparator means for comparing said count with one half of the number of said weighing units to produce a control signal relating the difference therebetween, and loading control means responsive to said control signal for controlling the amount of articles fed by said loading means to each cradle thereby maintaining said count substantially equal to one half of the number of said weighing units.

2. A combination weighing machine, according to claim 1, wherein said counting means include a shift register having the outputs of said combination memory as its parallel bit inputs, respectively, and a counter coupled to the output of said register for counting one level of the output of said shift register.

* * * * *